Dec. 22, 1959        A. F. SMITH        2,918,394

LAMINATED WALL STRUCTURE

Filed Sept. 20, 1957

INVENTOR.
ARTHUR F. SMITH
BY
Attorney

United States Patent Office 2,918,394
Patented Dec. 22, 1959

2,918,394

LAMINATED WALL STRUCTURE

Arthur F. Smith, Webster, N.Y., assignor to Ethane Corporation, New York, N.Y., a corporation of New York Application September 20, 1957, Serial No. 685,234

14 Claims. (Cl. 117—138.8)

This invention relates to a novel construction for lightweight pipes and containers.

In recent years, technical advances in plastics technology have made possible the construction of pipes and containers that are lighter in weight than the corresponding metallic products of the same capacity, and that are more resistant to corrosion. However, the use of plastics in such applications has presented new problems. For example, some plastics tend to become brittle upon aging and lose their flexibility. Obviously, such materials are not suitable for use where flexibility is desired or is mandatory.

In addition, some plastic materials do not have a sufficiently high burst strength to permit their use where high fluid pressures are encountered. Still other plastic materials tend to undergo a change in properties after prolonged exposure to air and sunlight, and frequently, cracking and general weakening result.

Isotactic polypropylene is a plastic material that has some physical properties that would make it highly advantageous for use in pipes and containers, but it also has other properties that have prevented its use for these purposes. The name "isotactic polypropylene" has been applied to stereospecific polymers of propylene, in which each repeating unit in the chain has the name steric configuration, at least over long intervals of the chain. These polymers are substantially crystalline. Isotactic polypropylene has an exceptionally high tensile strength when oriented, so that it would be an ideal material for irrigation pipes, garden hose, and for similar uses; but it loses its orientation upon exposure to sunlight and weakens, and moreover, it has very low abrasion resistance, and an extremely low adhesive affinity for known materials. These characteristics have limited its use in the past.

One object of the present invention is to provide a novel construction for pipes and for containers that will provide lightweight, high strength structures at reasonable cost.

Another object of the invention is to provide strong plastic containers and pipes that will not deteriorate upon aging, even when exposed to oxygen, sunlight, or other destructive conditions, over prolonged periods of time.

Still another object of the invention is to provide a plastic pipe that is particularly suited for applications such as irrigation piping and garden hose by reason of its exceptionally high burst strength and light weight.

A further object of the invention is to provide means by which oriented isotactic polypropylene can be employed successfully in certain applications where high abrasion resistance and exposure to sunlight are required.

A related object of the invention is to provide a container construction material that possesses the high tensile strength and light weight of oriented isotactic polypropylene together with the high abrasion resistance, inertness toward sunlight, and high adhesive affinity of certain of the adducts of organic polyisocyanates.

Other objects of the invention will become apparent to those skilled in the art from consideration of the following description of pipes and containers that are constructed according to this invention.

According to the invention, in constructing pipes and containers, use is made of a combination of two known plastic materials that are selected specifically so that the properties of the plastics are complementary. The wall of the pipe or container is made with two layers, one layer made of one material, and the other layer made of the second material. The two layers are securely bonded together, so that the wall has a laminated structure.

Oriented isotactic polypropylene is an excellent material for the inner layer. It has excellent tensile strength, unusually good elongation of the break point, and is inert to attack by many materials. However, it has very low abrasion resistance and undergoes degradation in light and particularly in sunlight, and consequently, loses some of its desirable properties. Moreover, it can be adhered to other materials only with great difficulty. Consequently, any pipe or container made of this material alone would be difficult to construct, and would have limited use.

Certain adducts of organic polyisocyanates have properties that are complementary to those of isotactic polypropylene, and these adducts provide excellent materials for the outer layer. These adducts have excellent abrasion resistance, are not affected by sunlight and will protect isotactic polypropylene against abrasion and light, and will adhere to practically anything.

In one embodiment, then, the invention involves the use of two plastic layers in the construction of the wall of a container or pipe, the inner layer being made of oriented isotactic polypropylene, and the outer layer being formed from an adduct of an organic polyisocyanate.

The details of construction of several embodiments of the invention can be best understood by consideration of the following description, considered together with the drawing.

EXAMPLE 1

Irrigation pipe

Referring now in detail to the drawings, an irrigation pipe 10 may be formed with a laminated wall that has two layers. The inner layer 11 is made from oriented isotactic polypropylene that has high tensile strength, low abrasion resistance, but that is subject to loss of orientation upon exposure to sunlight. The outer layer 12 forms a protective covering for the inner layer 11, and is made from an adduct of an organic polyisocyanate that has high abrasion resistance, that protects the oriented polymeric material from light, and that has a modulus of elasticity in tension, $M_c$, that is about the same as, or lower than, the modulus of elasticity in tension of the isotactic polypropylene.

Figure 1:
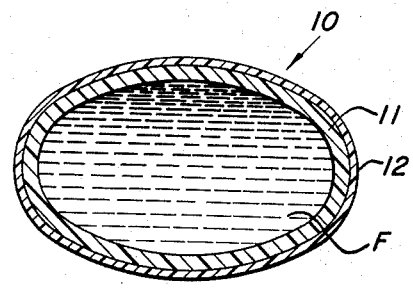
Fig. 1 is a section of a pipe that is constructed according to one embodiment of the invention, showing the pipe filled with a fluid.
Figure 2:
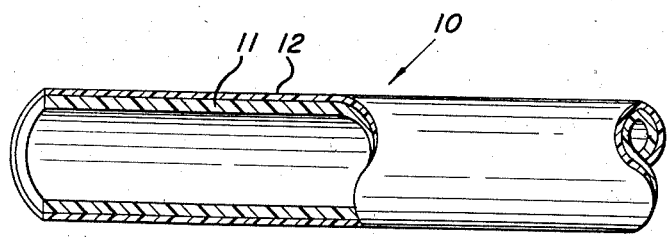
Fig. 2 is a side elevation thereof, partly broken away.
Figure 3:
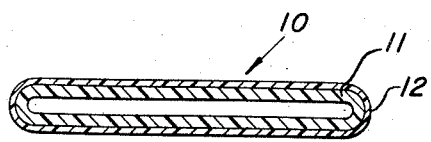
Fig. 3 is a section of the pipe when not under pressure, collapsed upon itself.

Preferably, the irrigation pipe 10 is formed with an elliptical section, as shown, so that when the pipe 10 is not subjected to the internally applied pressure of a fluid F, the pipe will collapse upon itself as shown in Fig. 3, to form an essentially flat, ribbon-like body that can be rolled up easily for storage, and that will occupy a minimum amount of space.

The inner diameter of an irrigation pipe that can be made to demonstrate the invention, may be, for example, about twelve inches. The inner layer 11 of the pipe can be made from an extruded tube of oriented isotactic polypropylene that has an average molecular weight of better than 100,000. The wall thickness may be about 0.020", and this wall thickness will provide a burst strength that is in excess of 1,000 p.s.i. The outer layer 12 can be formed from a coating of a tolylene diisocyanate adduct with an equimolecular or slightly excess amount of polyethylene glycol 600. The thickness of this coating can be on the order of 0.005".

EXAMPLE 2

Garden hose

Garden hose having a similar elliptical cross-section can be made with a construction that is generally similar to that of the irrigation pipe that was described in Example 1.

The inner layer of the wall of the garden hose can be formed from isotactic propylene that has a molecular weight in excess of 100,000. The wall thickness of the inner layer of isotactic propylene may be about 0.010" for a hose that has an inner diameter of ⅝". The outer layer of the wall should have a thickness in the range from about 0.0005" to about 0.005", and a preferred polyisocyanate adduct that can be used to form the outer layer is the adduct that is obtained by the reaction of substantially equimolecular portions of tolylene diisocyanate with polyethylene glycol 600.

Such a garden hose will have a burst strength of about 1,100 p.s.i. One hundred feet of this hose will weigh less than one pound.

The cost of the materials is very low and compares favorably with the cost of vinyl and other plastics that are now employed in the manufacture of hoses.

The thin coating of the polyisocyanate adduct that forms the outer layer of the hose wall provides excellent abrasion resistance, good weathering properties, and good resistance to friction. The oriented isotactic polypropylene tube that forms the inner layer of the hose wall has very high burst strength, and therefore permits the use of an extremely thin wall thickness, so that while an unusually strong hose is obtained, the weight of the hose is amazingly low.

The same double layer wall construction can be employed for the construction of fluid containers. For example, cylinders, spheres, and oblate spheroids can be formed easily with two-layered walls that are constructed according to this invention. Where necessary, sections of sheet material can be united by cements that are made from highly adherent polyisocyanate adducts, to form any desired shapes.

For transporting and storing fluids that contain abrasive particles, such as slurries of magnesium carbonate and the like, a three-layered wall construction can be employed, in which a film of oriented isotactic polypropylene is interposed between two thin coatings of a polyisocyanate adduct that will protect the oriented polymer.

In general, the polymers (including copolymers), that can be used to form the inner wall of a pipe or container, can be defined as head-to-tail polymers of ethylenically-unsaturated compounds that have at least three carbon atoms; that have an average molecular weight of at least about 100,000; that have the general formula:

—CH$_2$—CHR—CH$_2$—CHR— in which R is a member of the group consisting of alkyl, cycloalkyl, and aryl; and that are substantially crystalline. The preferred polymer is highly crystalline, isotactic polypropylene that has a molecular weight in excess of 100,000, and a density in the range of 0.90 to 0.97. Isotactic propylene can be oriented readily, and when oriented, has exceptional strength. Substantially crystalline isotactic propylene, that has a molecular weight in excess of 100,000, is usually obtained by fractionation from reaction mixtures that contain less highly polymerized and less highly crystallized propylenes.

For example, a mixture of polypropylenes that can be obtained from a propylene polymerization with Ziegler catalysts, such as, for example, a mixture of diethyl aluminum chloride and titanium tetrachloride, will include three major fractions as follows: a first fraction that is soluble in boiling ether, and that has a moleculfar weight better than 2,000 and ranging up to about 45,000, a density below 0.90, and the visco-elastic properties of an unvulcanized elastomer; a second fraction that is not soluble in boiling ether and that is soluble in n-heptane, and that has a molecular weight in the range between 45,000 and 100,000 that is partially crystalline, and whose crystallinity is stable at 100° C. but disappears completely at 150° C., and that has the physical properties of an elastomer at temperatures slightly above 100 C.; and a third fraction that contains substantially completely crystalline polypropylene that has a molecular weight in excess of 100,000, a density between 0.90 and 0.97, and an unusually good tensile strength. In a typical reaction mixture of this type, the third fraction may comprise up to about 90% of the mixture, and it is readily separable from the other two fractions. The third fraction has the physical characteristics that are desired for use in this invention.

Other suitable polymers include copolymers of propylene and with minor amounts of other olefins, such as, for example, ethylene, the minor amounts being not sufficient substantially to modify the desirable characteristics of isotactic propylene.

In general, polymers that are satisfactory for use can be prepared in the manner described in Belgian Patent 538,782. This patent describes the Ziegler process for preparing highly crystalline polymers of propylene, and highly crystalline copolymers of propylene together with minor amounts of other olefins.

These crystalline polymers and copolymers have outstanding physical characteristics. For example, oriented, highly crystallized isotactic polypropylene has a tensile strength on the order of 100,000 p.s.i., and an elongation at the break point of about 27% to about 70%. These properties are affected by variations in molecular weight of the polymers, and by their degree of orientation. Typically, these polymers are not stable in sunlight and undergo a gradual degradation upon continued exposure. Moreover, these polymers have low abrasion resistance and do not adhere readily to anything.

The outer layer is made from a material that has properties that complement the properties of the oriented isotactic polypropylene. Certain of the polyisocyanate adducts are exactly suited for this purpose, and have good abrasion resistance, phenomenal adhesive power, good weathering properties, and good friction resistance. They are stable in sunlight and can protect the oriented polymeric film from the effects of the broad spectrum of sunlight and from abrasion.

The particular adduct that is selected should have a modulus of elasticity in tension that is similar to or that is lower than the modulus of elasticity in tension of the oriented isotactic polypropylene. This is a necessary characteristic because, despite the high adhesive powers of the polyisocyanate adducts, the bond that is formed between the isotactic polypropylene layer and the adduct layer is not as strong as might be desired, because of the lack of adhesive affinity of isotactic polypropylene for anything, including the polyisocyanate adduct.

When a container or pipe, that is constructed according to this invention, is released from a high internal pressure, the outer layer should have sufficient elasticity to return to its original size at about the same rate as the inner layer would, alone. Thus, there will be no tendency for the layers to pull apart.

A great many polyisocyanate adducts can be employed.

In general, however, the class of adducts that is satisfactory can be defined approximately as the class that includes the reaction products of organic polyisocyanates with a member of the group selected from the class consisting of polyhydroxyl, polyamine, polyamide, and polycarboxyl organic compounds, and that have a modulus of elasticity in tension above that of the oriented, crystalline polymer film with which the adduct is to be associated. The reactive groups of the polyfuctional compound, for example, the two reactive hydroxyl groups in a dihydroxyl compound, in general should be spaced apart by a distance that is at least equivalent to a distance between about twelve serially-connected carbon atoms in a chain. For example, polyethylene glycols that have a molecular weight above about 300 can be used, but those of lower molecular weight produce adducts that are too brittle. In general, adducts with the alcohols are preferred because these adducts have the best physical characteristics. The adduct must be selected to have high abrasion resistance, good film-forming properties, good adhesive characteristics, and a modulus of elasticity in tension that is about the same or lower than that of the associated oriented film of isotactic polypropylene; in other words, it must have hysteresis properties such that it always tends to hug the inner layer tightly. In general, the polyhydroxy reactant should be in slight excess, in forming the adduct.

In general, the symmetrical aromatic diisocyanates are preferred to the aliphatic diisocyanates. The following polyols or mixtures of polyols can be used to prepare adducts with tolylene diisocyanate, that are well adapted for use in this invention:

Polyethylene glycol 400
A mixture having equimolecular proportions of polyethylene glycol 400 and butylene glycol (1,3-butanediol)
A mixture having equimolecular proportions of polyethylene glycol 400 and 2,3-butanediol
Monoglyceride of castor oil fatty acid
Dihydroxyoctachlorobiphenyl
Polyethylene glycol 600
Polyethylene glycol 1000
A mixture having equimolecular proportions of polyethylene glycol 400 and sucrose The numerals following the names of the polyols above, and elsewhere herein, denote their respective approximate molecular weights.

The following polyols can be reacted with diphenylmethane diisocyanate to form polymers that can be used according to this invention:

Polypropylene glycol 2000
Polyethylene glycol 600
Polypropylene glycol 750
Propylene glycol monoricinoleate
Polyethylene glycol 400
Polypropylene glycol 400
Castor oil Polyester-urethane adducts may also be employed. In general, it is preferred that the polyesters be formed with a molecular excess of glycol, in order that the polyester terminates in hydroxyl groups. For example, in forming suitable polyesters, ethylene glycol can be reacted with dicarboxylic acids such as, for example, succinic, adipic, diglycolic, and phthalic acids, employing a molecular excess of the glycol, so that the polyester terminates in hydroxyl groups. These polyesters can then be reacted with diisocyanates such as, for example, 4,4' xenylene diisocyanate; 1,5 naphthalene diisocyanate; methylene bis(4-phenylisocyanate); 2,4 tolylene diisocyanate; and 2,4,6 tolylene triisocyanate. Other suitable linear polyesters include, for example, the adducts that are formed by the reaction of 1,2 propylene glycol with succinic or adipic acids; and the adducts that are formed by the reaction of 2,3 butylene glycol with adipic acid; the glycol always being in excess. Still other satisfactory adducts can be selected from those that are disclosed in U.S. Patent 2,620,516, granted December 9, 1952, to K. E. Muller.

In selecting the polyisocyanate adduct that is to be employed, the physical characteristics will be determinative. A tremendous number of polyisocyanate adducts may be employed, within the general class described above. Many suitable adducts are described in the publication, "Polyurethane" by Otto Bayer, a publication of Farbenfabriken Bayer, Leverkusen, Germany, 1947; and in British Patent 636,423.

Many of these adducts are opaque and will not transmit sunlight. Where necessary, however, a small amount of an opacifying pigment can be added to the adduct to render it opaque. Suitable pigments include titanium dioxide, carbon black, phthalocyanine blue and green, and cadmium red and yellow. These pigments reflect a broad spectrum and are examples of good protective pigments. Excellent protection against sunlight can also be obtained by forming a surface deposit of metal, such as, for example, aluminum, on the film of isotactic polypropylene by vacuum deposition. The metallic deposit acts as a mirror and can reflect all light, thus protecting the isotactic polypropylene. The isocyanate adducts adhere as readily to metallic deposits as to the isotactic polypropylene.

In general, the preferred adducts that can be used are the adducts of tolylene diisocyanate with the polyethylene glycols, that have a molecular weight in the range 400 to about 1200.

In forming pipes according to the invention, the isotactic polypropylene is extruded in tubular form, and is stretched three to five times its extruded length to orient the polymer. Orientation increases the tensile strength of the extruded film, and thus increases the burst strength of the tube, by a factor of about ten. After the film has been oriented, a metallic deposit can be formed on its surface, if desired. The polyisocyanate adduct is then applied to the exterior surface of the extrusion by dipping or spraying, or in some other suitable way. Depending upon their composition, the adducts are soluble in many volatile solvents, such as, for example, benzene, and the thickness of the coating that is applied can be controlled by adjusting the viscosity of the solution, or by passing the coated extrusion through a ring die to wipe off any excess. Preferably, the adduct coating is applied to the extrusion while the extrusion is still warm, in order to use the heat of the extrusion to cure the coating of adduct.

A similar technique can be used to make coated sheets. Where the isotactic polypropylene is extruded or cast as a sheet, it can be coated with the isocyanate adduct while in sheet form, or after it has been formed into a tubular shape. Separate sheets or parts can be united by employing an adhesive that contains a polyisocyanate adduct.

While materials other than the isocyanate adducts could be employed to protect the oriented isotactic polypropylene, these adducts are so superior in their physical characteristics that other materials are not competitive. For example, poly(vinyl chloride) does adhere to oriented isotactic polypropylene, but its abrasion resistance is about $\frac{1}{500}$th the abrasion resistance of the isocyanate adducts.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

I claim:
1. A wall structure for containers, pipes, hoses, and the like, comprising at least two discrete layers, a first one of said layers comprising an oriented, substantially crystalline polyolefinic material that has high tensile strength and low abrasion resistance, and a second layer disposed in protective relation thereto and comprising an organic polyisocyanate adduct that has high abrasion resistance and that is adhesively bonded to said first layer.

2. A wall structure for containers, pipes, hoses, and the like, comprising at least two discrete layers, a first one of said layers comprising in film form a head-to-tail, substantially crystalline oriented polymer of an unsaturated compound that has at least three carbon atoms, said polymer having an average molecular weight of at least about 100,000 and having the general formula:

—CH$_2$—CHR—CH$_2$—CHR— in which R is a member selected from the group consisting of alkyl, cycloalkyl, and aryl, said polymeric film having high tensile strength and relatively low abrasion resistance, the second of said layers having high abrasion resistance and being disposed in protective relation to said first layer, and comprising an organic polyisocyanate adduct that is adhesively bonded to said first layer.

3. A wall structure for containers, pipes, hoses, and the like, comprising at least two discrete layers, an inner layer comprising in film form a head-to-tail, substantially crystalline, oriented polymer of an olefin that has at least three carbon atoms, said polymer having an average molecular weight of at least about 100,000 and having the general formula: —CH$_2$—CHR—CH$_2$—CHR— in which R is a member selected from the group consisting of alkyl, cycloalkyl, and aryl, said polymeric film having high tensile strength and relatively low abrasion resistance and being subject to degradation upon exposure to sunlight, and an outer layer in film form and having high abrasion resistance and disposed in protective relation to said inner layer, said outer layer comprising a composition that protects said oriented polymer from sunlight and including an adduct of an organic polyisocyanate with a polyhydroxy alcohol, said outer layer having a modulus of elasticity in tension that is at least as low as that of the inner layer and being adhesively bonded to said inner layer.

4. A wall structure for containers, pipes, hoses, and the like, comprising at least two discrete layers, an inner layer comprising an oriented substantially crystalline polypropylene that has an average molecular weight of at least about 100,000 and that is characterized by high tensile strength and low abrasion resistance, and an outer layer disposed in protective relation to said inner layer and having high abrasion resistance and comprising an adduct of an organic polyisocyanate with a polyhydroxy alcohol, said outer layer having a modulus of elasticity in tension that is at least as low as that of the inner layer and being adhesively bonded to said inner layer.

5. A wall structure for containers, pipes, hoses, and the like comprising at least two discrete layers, an inner layer comprising an oriented isotactic polypropylene that has an average molecular weight of at least about 100,000 and that is characterized by high tensile strength and low abrasion resistance, and an outer layer disposed in protective relation to said inner layer and having high abrasion resistance and comprising an adduct of tolylene diisocyanate and polyethylene glycol 400, said outer layer having a modulus of elasticity in tension that is at least as low as that of the inner layer and being adhesively bonded to said inner layer.

6. A wall structure for containers, pipes, hoses, and the like, comprising at least two discrete layers, an inner layer comprising an oriented isotactic polypropylene that has an average molecular weight of at least about 100,000 and that is characterized by high tensile strength and low abrasion resistance, and an outer layer disposed in protective relation to said inner layer and having high abrasion resistance and comprising an adduct of an organic diisocyanate and a polyethylene glycol that has an average molecular weight of at least 300, said outer layer having a modulus of elasticity in tension that is at least as low as that of the inner layer and being adhesively bonded to said inner layer.

7. A wall structure for containers, pipes, hoses, and the like, comprising at least two discrete layers, an inner layer comprising an oriented isotactic polyproplyene that has an average molecular weight of at least about 100,000 and that is characterized by high tensile strength and low abrasion resistance, and an outer layer disposed in protective relation to said inner layer and having high abrasion resistance and comprising an adduct of an organic diisocyanate and a polypropylene glycol that has an average molecular weight of at least 300, said outer layer having a modulus of elasticity in tension that is at least as low as that of the inner layer and being adhesively bonded to said inner layer.

8. A wall structure for containers, pipes, hoses, and the like, comprising at least two discrete layers, the first of said layers comprising in film form an oriented, substantially crystalline polymer of an olefin that has at least three carbon atoms, said polymer having an average molecular weight of at least about 100,000, and having the general formula: —CH$_2$—CHR—CH$_2$—CHR— in which R is a member selected from the group consisting of alkyl, cycloalkyl, and aryl, said polymeric film having high tensile strength and low abrasion resistance, the second of said layers having high abrasion resistance and being disposed in protective relation to said first layer and adhesively bonded thereto and comprising an adduct of an organic polyisocyanate with a member that has at least two active hydrogens and that is selected from the group consisting of polyhydroxyl, polyamine, polyamide, and polycarboxyl compounds that have their active hydrogens spaced apart by a distance that is at least equivalent to the distance between about twelve serially-connected carbon atoms in a chain.

9. A wall structure for containers, pipes, hoses, and the like, comprising at least two discrete layers, the first of said layers comprising in film form an oriented, substantially crystalline polymer of an olefin that has at least three carbon atoms, said polymer having an average molecular weight of at least about 100,000, and having the general formula: —CH$_2$—CHR—CH$_2$—CHR— in which R is a member selected from the group consisting of alkyl, cycloalkyl, and aryl, said polymeric film having high tensile strength and low abrasion resistance, and the second of said layers having high abrasion resistance and being disposed in protective relation to said first layer and adhesively bonded thereto and comprising an adduct of an organic polyisocyanate with a member that has at least two active hydrogens and that is selected from the group consisting of polyhydroxyl, polyamine, polyamide, and polycarboxyl compounds, said second layer having a modulus of elasticity in tension that is at least as low as that of said first layer.

10. A pipe having an elliptical cross-section and comprising a wall that is formed from a film of an oriented isotactic polypropylene that has an average molecular weight of at least about 100,000 and that is characterized by high tensile strength and low abrasion resistance and that is subject to degradation upon exposure to sunlight, and an outer coating over said film that is disposed to protect said film from sunlight and that is adhesively bonded thereto, said coating comprising an adduct of an organic polyisocyanate with a member that has at least two active hydrogens and that is selected from the group consisting of polyhydroxyl, polyamine, polyamide, and polycarboxyl compounds, said coating having a modulus of elasticity in tension that is at least as low as that of said film.

11. A sheet of an oriented isotactic polyolefinic material that has low abrasion resistance and that is subject to degradation upon exposure to sunlight, and a protective coating disposed on at least one surface of said sheet and adhesively bonded thereto and comprising a polyisocyanate adduct that has high abrasion resistance and that can protect said sheet from sunlight.

12. A sheet that is made of oriented film of a head-to-tail, substantially crystalline polymer of an olefin that has at least three carbon atoms, said polymer having an average molecular weight of at least 100,000 and having the general formula: —$CH_2$—CHR—$CH_2$—CHR— in which R is a member selected from the group consisting of alkyl, cycloalkyl, and aryl, said film having relatively low abrasion resistance and being subject to degradation upon exposure to sunlight, and an abrasion resistant continuous coating adhesively bonded on at least one surface of said sheet that can protect said film from sunlight, said coating comprising an adduct of an organic polyisocyanate with a polyfunctional compound selected from the group consisting of polyhydroxyl, polyamine, polyamide, and polycarboxyl compounds that have at least two active hydrogens, said coating having a modulus of elasticity in tension that is at least as low as that of said film.

13. A sheet of an oriented isotactic polypropylene that has an average molecular weight of at least about 100,000 and that is characterized by relatively low abrasion resistance and that is subject to degradation upon exposure to sunlight, and a protective coating disposed on at least one surface of said sheet and adhesively bonded thereto and comprising an adduct of an organic polyisocyanate with a polyfunctional compound selected from the group consisting of polyhydroxyl, polyamine, polyamide, and polycarboxyl compounds that have at least two active hydrogens, said coating having a modulus of elasticity in tension that is at least as low as that of said isotactic polypropylene.

14. A wall structure for containers, pipes, hoses, and the like, comprising: an inner layer that is made from an oriented, substantially crystalline polymer of an olefin that has at least three carbon atoms, said polymer having an average molecular weight about 100,000, and having the general formula: —$CH_2$—CHR—$CH_2$—CHR— in which R is a member selected from the group consisting of alkyl, cycloalkyl, and aryl, said inner layer having high tensile strength and low abrasion resistance; an extremely thin metallic film deposited on the outer surface of said inner layer, said metallic film being characterized by specular reflectivity and being sufficiently flexible to conform to the shape of the surface of said inner layer when said inner layer is flexed; and an outer layer disposed over said metallic film in protective relation to said film and said first layer and comprising an adduct of an organic polyisocyanate with a member that has at least two active hydrogens and that is selected from the group consisting of polyhydroxyl, polyamine, polyamide and polycarboxyl compounds, said outer layer having a modulus of elasticity in tension that is at least as low as that of said inner layer.

References Cited in the file of this patent
UNITED STATES PATENTS

| | | |
|---|---|---|
| 2,645,249 | Davis et al. | July 14, 1953 |
| 2,729,618 | Muller et al. | Jan. 3, 1956 |
| 2,763,316 | Stohl | Sept. 18, 1956 |
| 2,791,576 | Field et al. | May 7, 1957 |
| 2,818,404 | Hill | Dec. 31, 1957 |

FOREIGN PATENTS

| | | |
|---|---|---|
| 538,782 | Belgium | Dec. 6, 1955 |

OTHER REFERENCES

Chemical Engineering, vol. 57, Issue 4, pp. 165–166 (April 1950).